United States Patent
Yoshida (10) Patent No.: US 6,222,419 B1
(45) Date of Patent: *Apr. 24, 2001

(54) OVER-SAMPLING TYPE CLOCK RECOVERY CIRCUIT USING MAJORITY DETERMINATION

(75) Inventor: Ichiro Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/266,887

(22) Filed: Mar. 12, 1999

(30) Foreign Application Priority Data

Mar. 12, 1998 (JP) .................................................. 10-061736

(51) Int. Cl.⁷ ........................................................ H03L 7/00
(52) U.S. Cl. ...................... 331/11; 331/DIG. 2; 375/376; 327/149
(58) Field of Search .............................. 331/10, 11, 1 A, 331/DIG. 2; 375/374; 327/148, 144, 149

(56) References Cited

U.S. PATENT DOCUMENTS 5,633,899 * 5/1997 Fiedler et al. ....................... 375/376

FOREIGN PATENT DOCUMENTS

| 61-145945 | 7/1986 | (JP) . |
| 61-214842 | 9/1986 | (JP) . |
| 3-69238 | 3/1991 | (JP) . |
| 4-11431 | 1/1992 | (JP) . |

OTHER PUBLICATIONS

Lee, et al.; "A 622 Mb/s CMOS Clock Recovery PLL with Time–Interleaved Phase Detector Array".

* cited by examiner

Primary Examiner—Robert Pascal
Assistant Examiner—Kimberly Glenn
(74) Attorney, Agent, or Firm—McGinn & Gibb, PLLC (57) ABSTRACT

An over-sampling type clock recovery circuit includes a phase difference determining section and a phase adjusting section. The phase difference determining section determines a phase difference between a data signal and a plurality of clock signals using majority determination, to produce a phase adjustment signal. The phase adjusting section adjusts phases of the plurality of clock signals based on the phase adjustment signal.

20 Claims, 9 Drawing Sheets

Fig. 1 PRIOR ART

Fig. 2A PRIOR ART data

Fig. 2B PRIOR ART clk$_{n-1}$

Fig. 2C PRIOR ART clk$_n$

Fig. 2D PRIOR ART clk$_{n+1}$

LOCK STATE WITHOUT CLOCK PHASE SHIFT

Fig. 3A data 
PRIOR ART

Fig. 3B $clk_{n-1}$ 
PRIOR ART

Fig. 3C $clk_n$ 
PRIOR ART

Fig. 3D $clk_{n+1}$ 
PRIOR ART

DELAYED STATE DUE TO CLOCK PHASE SHIFT

Fig. 4

Fig. 6A data
Fig. 6B clk_{n-1}
Fig. 6C clk_n
Fig. 6D clk_{n+1}
Fig. 6E up — disable
Fig. 6F dn — disable
LOCKING STATE Fig. 7A data
Fig. 7B clk_{n-1}
Fig. 7C clk_n
Fig. 7D clk_{n+1}
Fig. 7E up — enable
Fig. 7F dn — disable
CLOCK DELAYING STATE Fig. 8A data
Fig. 8B clk_{n-1}
Fig. 8C clk_n
Fig. 8D clk_{n+1}
Fig. 8E up — disable
Fig. 8F dn — enable
CLOCK PROCEEDING STATE

Fig. 11

OVER-SAMPLING TYPE CLOCK RECOVERY CIRCUIT USING MAJORITY DETERMINATION

BACKGROUND OF THE INVENTION

1. Field of the Invention

The present invention relates to a clock recovery circuit in which clock signals are extracted from an inputted data signal, and more particularly, to an over-sampling type clock recovery circuit which performs sampling with a plurality of clock signals having different phases.

2. Description of the Related Art

In recent years, a high-speed protocol is proposed, such as Gbit Ethernet and Fiber Channel for data transmission. For this purpose, high speed processing is requested to a clock recovery circuit which extracts a clock signal from a data signal in a high speed transmission and a PLL circuit which establishes frequency synchronization between an internal clock signal and the transmitted clock signal. In order to respond to such a request, as disclosed in 1996 IEEE International Solid-State Circuits Conference, an over-sampling-type clock recovery circuit is proposed in which a transmitted data signal is sampled with a plurality of clock signals with different phases generated by an internal circuit.

Figure 1:
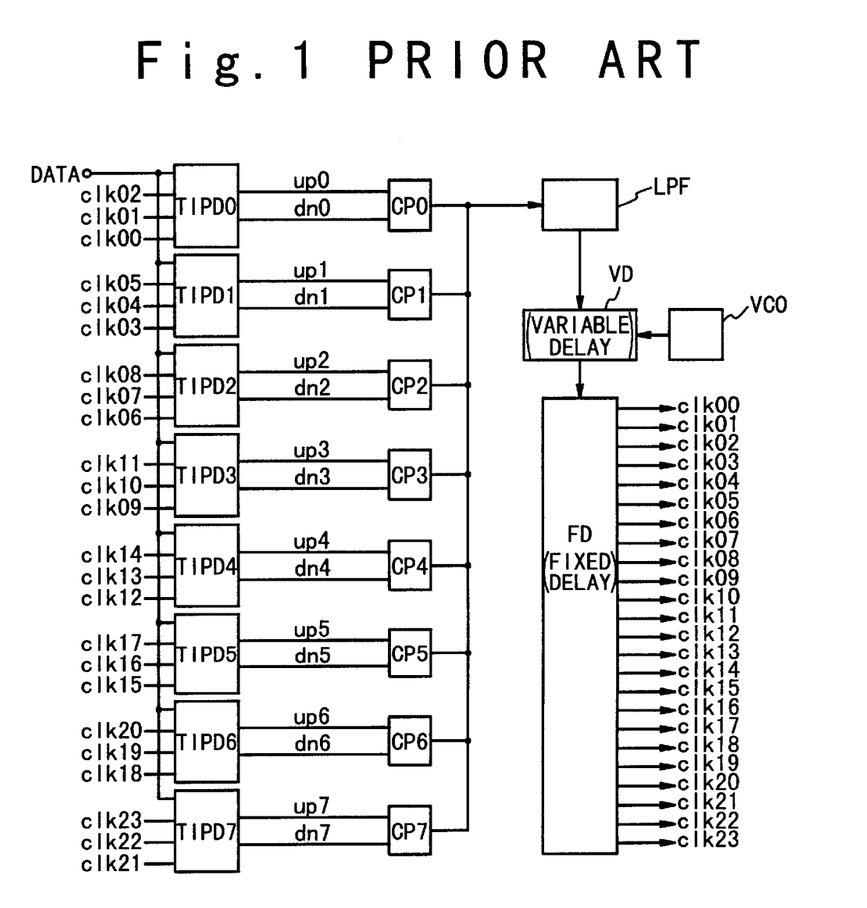
FIG. 1 is a block diagram of a conventional example of a clock recovery circuit.

FIG. 1 shows a block diagram of a clock recovery circuit which is disclosed in the conventional example. A data signal is supplied to eight phase comparators TIPD0 to TIPD7. Each phase comparator TIPD is supplied with every three clock signals of 24 clock signals having fixed delays outputted from a fixed delay circuit FD and detects a phase state between the data signal supplied and three clock signals.

Figure 2A:
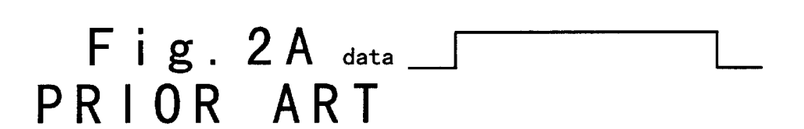
FIGS. 2A to 2F are timing charts to explain a lock state when there is no delay or leading of clock signals to a data signal in phase.
Figure 2B:
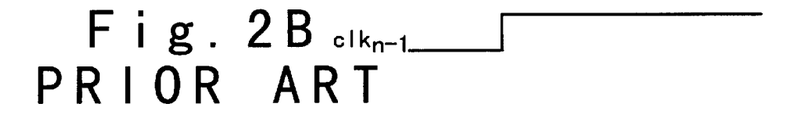
Figure 2C:
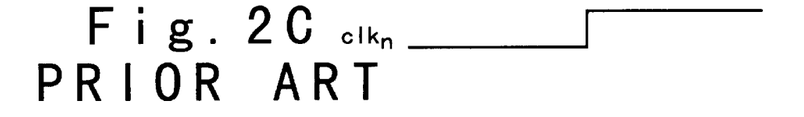
Figures 2D, 2E:
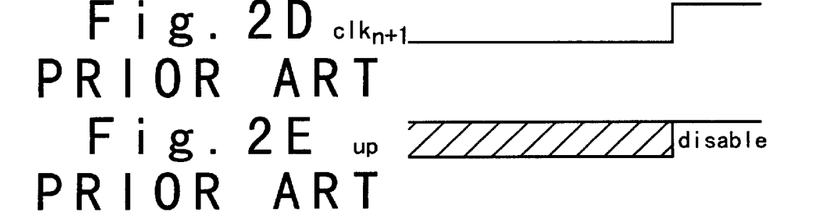
Figure 2F:
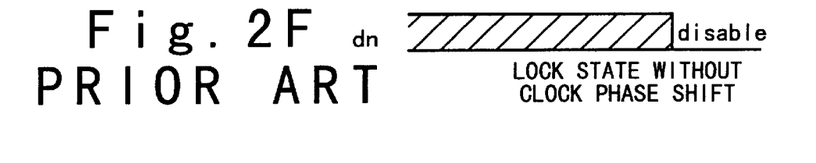
Figure 3A:
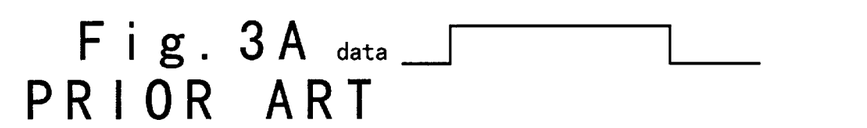
FIGS. 3A to 3F are timing charts to explain a delayed state of the clock signals than a data signal in phase.
Figure 3B:
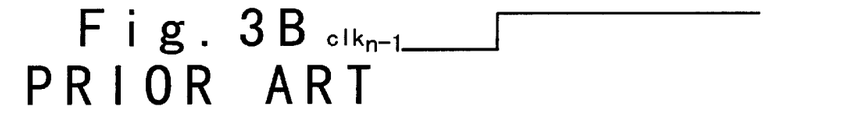
Figure 3C:
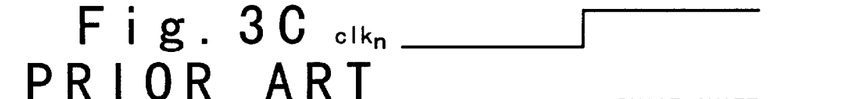
Figure 3D:
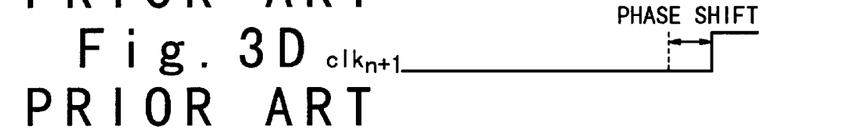
Figure 3E:
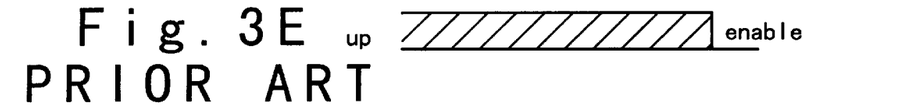
Figure 3F:
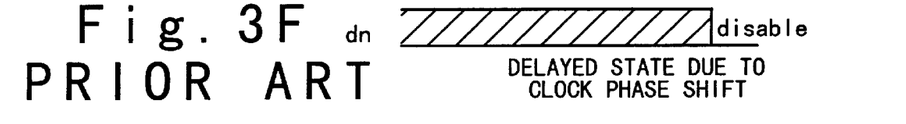

When the data signal is delayed more in relation to the clock signals, the phase comparator TIPD detects the leading of the clock signal in phase to set a dn signal as an output of the circuit to an enable state and an up signal as another output of the circuit to a disable state. Similarly, when detecting the delay of the clock signals in phase, the phase comparator TIPD sets the up signal to the enable state and the dn signal to the disable state. FIGS. 2A to 2F show a locking state. In this case, there is no delay or leading the clock signals in phase as shown in FIGS. 2A to 2D. Therefore, both of the up signal and the dn signal are set to the disable state, as shown in FIGS. 2E and 2F. On the other hand, FIGS. 3A to 3D shows the delay state of the clock signals. At this time, the up signal is set to the enable state, as shown in FIG. 3E and the dn signal is set to the disable state, as shown in FIG. 3F. In case of the leading state of the clock signals, the up signal is set to the disable state, and the dn signal is set to the enable state.

Each of charge pumps CP0 to CP7 increases the output voltages when the up signal is set to the enable state and decreases the output voltage when the dn signal is set to the enable state. A low pass filter LPF inputs the output voltages from the charge pumps CP0 to CP7 and integrates the change of these voltages. A variable delay circuit VD is supplied with the output voltage of the low pass filter LPF and a reference clock signal which is the output of a voltage controlled oscillator VCO. The variable delay circuit VD delays the reference clock signal in accordance with the output voltage from the low pass filter LPF. The fixed delay circuit FD is supplied with the output of the variable delay circuit FD and generates the 24 clock signals having fixed delays from the supplied clock signal.

In this way, in the conventional clock recovery circuit, each of the eight phase comparators TIPD0 to TIPD7 detects the leading or delay state of the clock signals in phase to set the up signal or dn signal is set to the enable state. As a result, the voltage outputted from the corresponding charge pump CP increases or decreases. Therefore, the variable delay circuit VD delays the reference clock signal based on the output voltage from the low pass filter LPF. The fixed delay circuit FD generates the 24 clock signals from the delayed reference signal. As a result, the phase leading or delay state of the clock signals in each of the phase comparators TIPD0 to TIPD7 is set to an adequate state so that the appropriate sampling of the data signal can be realized.

However, in the conventional clock recovery circuit, there is a problem. That is, the data sampling cannot be correctly performed when the phase differences are generated between the 24 clock signals due to the influence of a layout of wiring patterns in the clock recovery circuit. Especially, the data sampling cannot be correctly performed when the phase differences are generated between three clock signals supplied to the phase comparator TIPD. For example, when the a phase shift (delay) of the clock signal is generated in one of the three clock signals as shown in FIG. 3D, the phase comparator TIPD detects a clock delay state so that the up signal is set to the enable state. For this reason, the charge pump CP receives the up signal of the enable state and the fixed delay circuit FD delays the 24 clock signals. As a result, a correct data sampling cannot be performed in the whole clock recovery circuit including other phase comparators TIPD.

In addition to the above conventional example, a digital signal receiving apparatus is disclosed in Japanese Laid Open Patent application (JP-A-Showa 61-145945). In this reference, the digital signal receiving apparatus is composed of a reproducing section and a majority determining section and a conversion section. The reproducing section reproduces clock signals having a basic clock signal frequency fr and a frequency n (n is a positive integer equal to or larger then 3) times of the basic clock signal frequency fr locked to a digital reproduction signal in phase. The majority determining section extracts n samples values during one bit of the digital reproduction signal based on nfr clock signals, and determines binary values of the n sample values on the majority side as a value during the bit. The converting section converts the determined value to have 1/fr width. Thus, the digital reproduction signal is shaped in units of basic clocks fr of the digital reproduction signal.

Also, a data sampling converting circuit is disclosed in Japanese Laid Open Patent application (JP-A-Showa 61-214842). In this reference, the data sampling converting circuit is composed of a clock reproducing circuit, a frequency dividing circuit and a determining circuit. The clock reproducing circuit reproduces a clock pulse from a character multiplexed signal. The frequency dividing circuit divides the reproduced clock signal in frequency to 1 to n-th, and generates n sampling pulses with different phases. The determining circuit performs sampling of the character multiplexed signal with the n sampling pulses and determines based on majority determination of m continuous sampling results whether a digital data is in a high level or a low level.

Also, a demodulation data identifying and determining apparatus is disclosed in Japanese Laid Open Patent application (JP-A-Heisei 3-69238). In this reference, the demodulation data identifying and determining apparatus is composed of a detecting and demodulating circuit, a comparator, a clock reproducing circuit, a timing determining section, a latch circuit. The detecting and demodulating circuit demodulate an input signal to output a base band signal. The comparator converts the base band signal into a binary signal. The clock reproducing circuit reproduces a reproduction clock signal having the same frequency as a bit rate of a transmission data, and generates a clock signal faster than the reproduction clock signal. The timing determining section performs sampling of the binary signal using the clock signal and performs majority determination to a plurality of values corresponding to a plurality of sampling points to output the result of the majority determination. The latch circuit latches the output from the timing determining section in accordance with the reproduction clock signal to output as a reproduced digital data.

Also, a digital signal reproducing circuit is disclosed in Japanese Laid Open Patent application (JP-A-Heisei 4-11431). In this reference, the digital signal reproducing circuit is composed of a demodulating section, a sampling section and a majority determining section. The demodulating section demodulates a digital modulated signal. The sampling section performs sampling of the demodulated digital signal in accordance with clock signals from a clock source. The majority determining section performs majority determination to a plurality of sampling values supplied from the sampling section.

SUMMARY OF THE INVENTION

The present invention has been devised to solve the above problems. Therefore, an object of the present invention is to provide an over-sampling type clock recovery circuit which can correct phases of clock signals.

Another object of the present invention is to provide an over-sampling type clock recovery circuit in which correct sampling of a data signal can be realized irrespective of a layout of clock signals.

In order to achieve a first aspect of this present invention, an over-sampling type clock recovery circuit includes a phase difference determining section and a phase adjusting section. The phase difference determining section determines a phase difference between a data signal and a plurality of clock signals using majority determination, to produce a phase adjustment signal. The phase adjusting section adjusts phases of the plurality of clock signals based on the phase adjustment signal.

The phase difference determining section includes N (N is an integer equal to or more than 1) phase comparators, a majority determining circuit and an adjustment signal generating section. The N phase comparators are provided for respective bits of data of the data signal. Each of the N phase comparators compares a corresponding one of the bits and a set of clock signals in phase to produce a comparison phase difference signal. The majority determining circuit determines majority of the N comparison phase difference signals and changing minority of the N comparison phase difference signals to match to the majority of the N comparison phase difference signals to generate N majority phase difference signals. The adjustment signal generating section generates the phase adjustment signal from the N majority phase difference signals.

In this case, each of the phase comparators generates as the comparison phase difference signals, a first signal when the data signal leads the clock signal set, and a second signal when the data signal is delayed than the clock signal set. The majority determining circuit determines the first signals to change each of the second signals into the first signal when the first signals are more than the second signals, and determines the second signals to change each of the first signals into the second signal when the second signals are more than the first signals. Also, the phase adjusting section includes an oscillator for generating a reference clock signal, a delay unit for delaying the reference clock signal based on the phase adjustment signal, and a clock signal generating section for generating the plurality of clock signals from the delayed reference signal such that each of the plurality of clock signals has a predetermined delay.

In order to achieve another aspect of the present invention, a method of n over-sampling type clock recovery circuit includes:

determining a phase difference between a data signal and a plurality of clock signals using majority determination, to produce a phase adjustment signal; and adjusting phases of the plurality of clock signals based on the phase adjustment signal.

In order to achieve still another aspect of the present invention, an over-sampling type clock recovery circuit includes an actual phase difference determining section for determining a phase difference between a data signal and a plurality of clock signals in units of bits of data of the data signals, to produce comparison phase difference signals, an adjustment signal generating section for determining majority of the comparison phase difference signals and generating a phase adjustment signal based on the determined majority, and a phase adjusting section for adjusting phases of the plurality of clock signals based on the phase adjustment signal.

DESCRIPTION OF THE PREFERRED EMBODIMENTS

Next, an over-sampling type clock recovery circuit of the present invention will be described below in detail with reference to the accompanied drawings.

Figure 4:
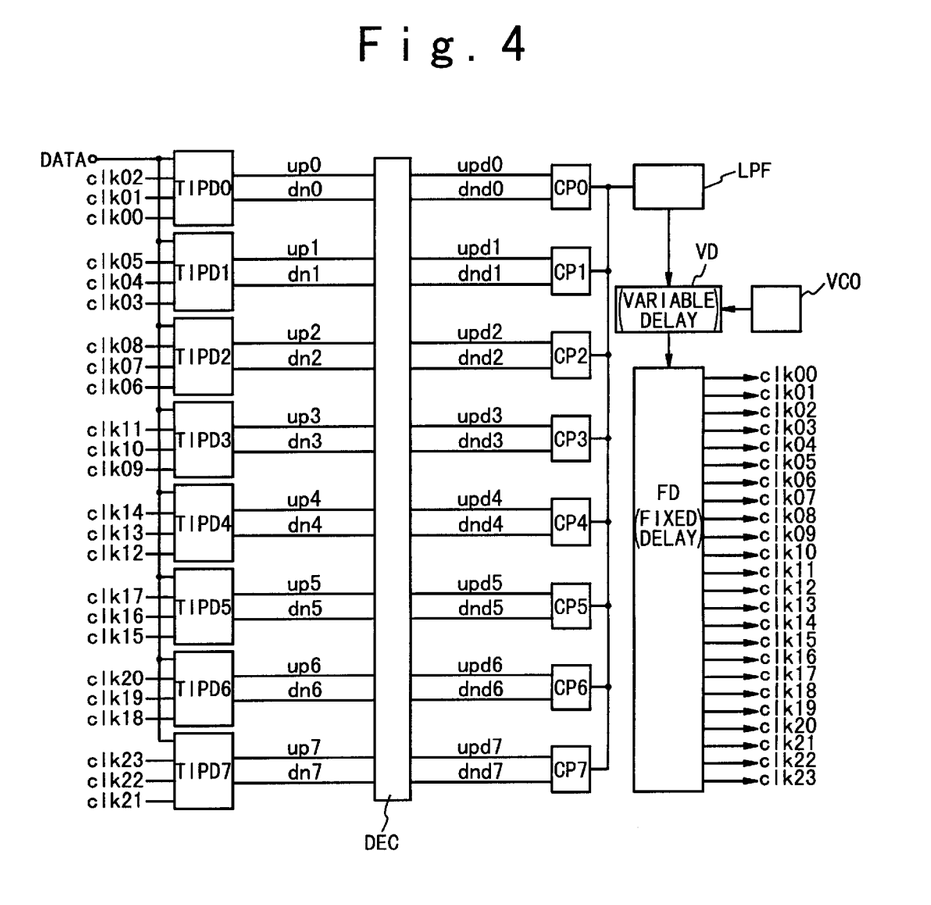
FIG. 4 is a block circuit diagram illustrating the structure of a clock recovery circuit according to an embodiment of the present invention.

FIG. 4 is a block circuit diagram illustrating the structure of the over-sampling type clock recovery circuit according to an embodiment of the present invention. The over-sampling type clock recovery circuit is composed of a plurality of phase comparators TIPD0 to TIPD7, a majority determining circuit DEC, a plurality of charge pumps CP0 to CP7, a low pass filter LPF, a voltage controlled oscillator VCO, a variable delay circuit VD, and a fixed delay circuit FD. It should be noted that the same reference symbols are allocated to the same components as those of the conventional clock recovery circuit.

In the embodiment, each of eight phase comparators TIPD0 to TIPD7 is provided to perform sampling of a data signal of 8 bits with three clock signals. That is, each of the phase comparators TIPD0 to TIPD7 inputs the 3 clock signals having fixed delays and the data signal transmitted thereto and detects the phase state between the data signal and the clock signals. When the data signal delays than the clock signal, the phase comparator detect the leading of the clock signal to the data signal to set a corresponding one of up signals up0 to up7 to a disable state and to set a corresponding one of dn signals dn0 to dn7 to an enable state. In the same way, when detecting the delay of the clock signals than the data signal, the phase comparator sets the corresponding up signal to the enable state and the corresponding dn signal to the disable state.

The majority determining circuit DEC is connected with the output terminals of the respective phase comparators TIPD0 to TIPD7. The majority determining circuit DEC determines the majority of the up or dn signals of the enable or disable states from the phase comparators TIPD0 to TIPD7 to determine whether the clock signals leads in phase than the data signal as the whole circuit. As the result of the majority determination, the states of the up signals and dn signals on the minority side are corrected to match to those of the up signals and dn signals on the majority side. Then, the majority determining circuit DEC outputs the up signals and dn signals on the majority side and the corrected up signals and dn signals on the minority side to the charge pumps CP0 to CP7 as upd signals and dnd signals, respectively.

Each of the charge pumps CP inputs corresponding ones of the upd signals and dnd signals from the majority determining circuit DEC and changes the output voltage in accordance with the input signals to outputs to the low pass filter LPF. The low pass filter LPF integrates the changes of the output voltages from the charge pumps CP0 to CP7 to output to the variable delay circuit VD. The variable delay circuit VD inputs a reference clock signal having a predetermined frequency supplied from the voltage controlled oscillator VCO and the output of the low pass filter LPF. The variable delay circuit VD delays the reference clock signal in accordance with the output voltage from the low pass filter LPF. Moreover, the fixed delay circuit FD inputs the output of the variable delay circuit VD, and generates 24 clock signals having fixed delays from the inputted clock signal. The 24 clock signals are supplied to the phase comparators TIPD0 to TIPD7 every three, respectively.

Figure 5A:
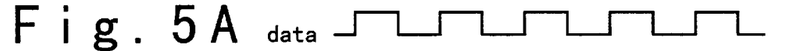
FIGS. 5A to 5Y are timing charts illustrating clock signals and a data signal.
Figure 5B:
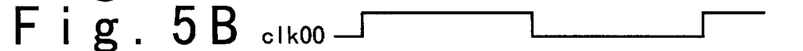
Figure 5C:
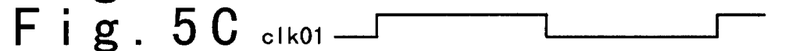
Figure 5D:
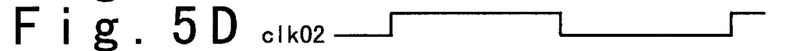
Figure 5E:
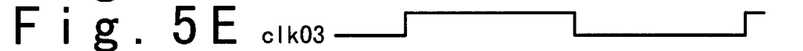
Figure 5F:
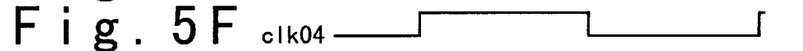
Figure 5G:
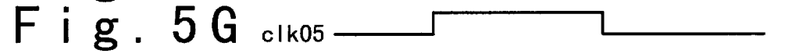
Figure 5H:
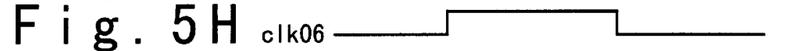
Figure 5I:
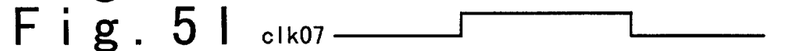
Figure 5J:
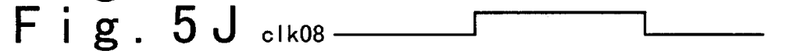
Figure 5K:
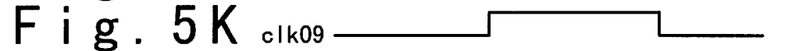
Figure 5L:
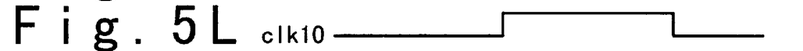
Figure 5M:
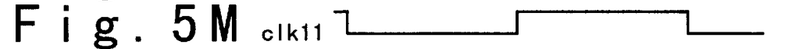
Figure 5N:
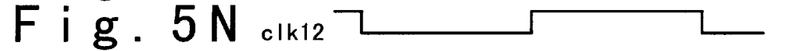
Figure 5O:
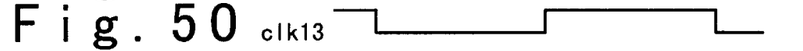
Figure 5P:
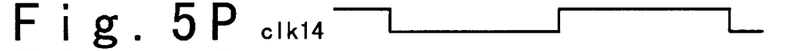
Figure 5Q:
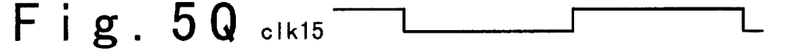
Figure 5R:
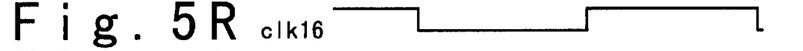
Figure 5S:
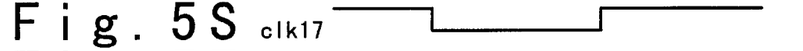
Figure 5T:
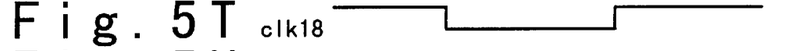
Figure 5U:
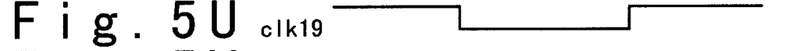
Figure 5V:
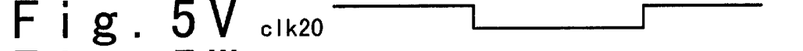
Figure 5W:
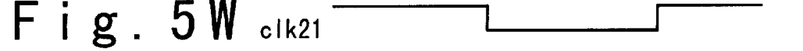
Figure 5X:
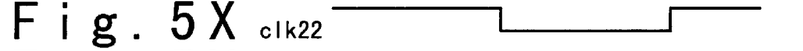
Figure 5Y:
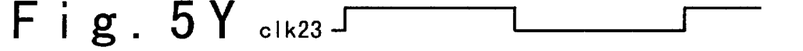

The operation of the clock recovery circuit having the above-mentioned structure will be described. FIGS. 5A to 5Y are time charts to explain the data signal supplied to the eight phase comparators TIPD0 to TIPD7 and the 24 clock signals used to perform sampling of the data signal. Also, FIGS. 6A to 6F, 7A to 7F, and 8A to 8F are timing charts to explain the operation of the each of the phase comparators TIPD0 to TIPD7. As described in the conventional example, each phase comparator detects the phase state between the data signal and corresponding set of three $clk_{n-1}$, $clk_n$ and $clk_{n+1}$ of the 24 clock signals.

Figures 6A, 6B:
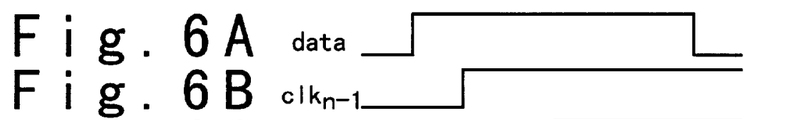
FIGS. 6A to 6F are timing charts to explain a locking state when there is no delay or leading of the clock signals than or to the data signal in phase.
Figures 6C, 6D, 6E:
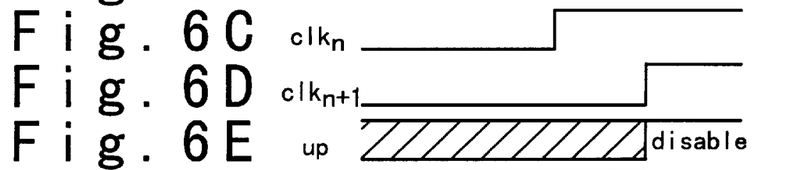
Figure 6F:
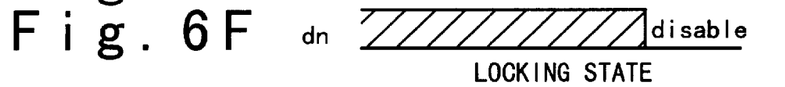
Figures 7A, 7B:
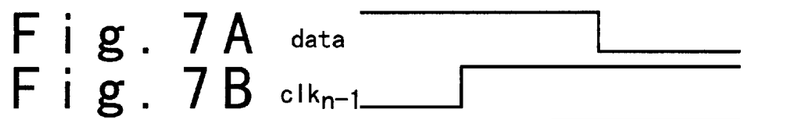
FIGS. 7A to 7F are timing charts to explain a delaying state of the clock signals than the data signal in phase.
Figures 7C, 7D:
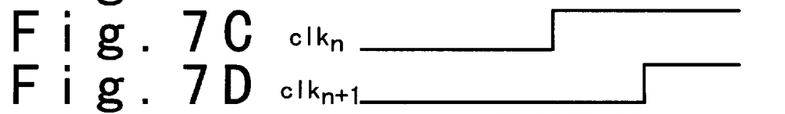
Figure 7E:
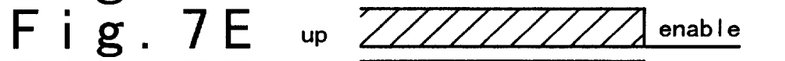
Figure 7F:
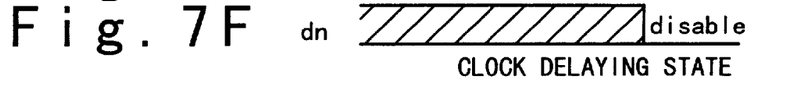
Figure 8A:
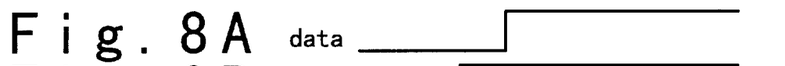
FIGS. 8A to 8F are timing charts to explain a leading state of the clock signals to the data signal in phase.
Figures 8B, 8C:
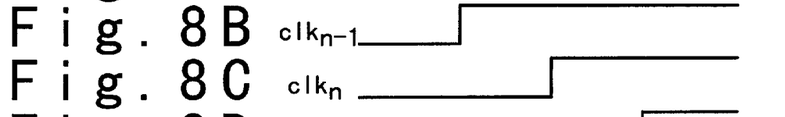
Figures 8D, 8E:
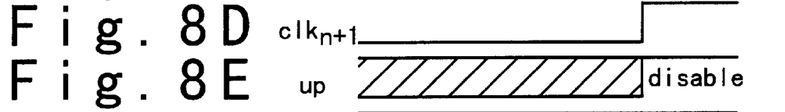
Figure 8F:
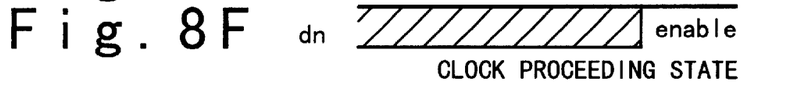

FIGS. 6A to 6F show a lock state in which the phases between the data signal and the clock signals are coincident with each other. Since there is no need to change the phases of the clock signals in the lock state, both of the up signal and the dn signal are set to the disable state, as shown in FIGS. 6E and 6F. FIGS. 7A to 7F show the leading state of the data signal to the clock signals in phase. When the clock signals delay than the data signal, the up signal is set to the enable state as shown in FIG. 7E and the dn signal is set to the disable state as shown in 7F. As a result, the phases of the clock signal are led. FIGS. 8A to 8F show the delay state of the data signal than the clock signals. When the clock signals lead than the data signal, the up signal is set to the disable state as shown in FIG. 8E and the dn signal is set to the enable state as shown in FIG. 8F. As a result, the phases of the clock signals are delayed.

Then, the up signal and dn signal of each phase comparator are supplied to the majority determining circuit DEC. The majority determining circuit DEC inputs the up signals and dn signals supplied from the respective phase comparators TIPD0 to TIPD7. The majority determining circuit DEC determines the majority of the detecting results of the respective phase comparators TIPD0 to TIPD7, that is, the phase difference data based on the supplied up signals and dn signals.

As described above, in the over-sampling type clock recovery circuit, sampling of the data signal with the clock signals having the fixed phase differences. Therefore, if the data signal is not to be high or low continuously, the phase difference data detected in each phase comparator becomes the same value even though there is any delay due to the phase difference of the clock signals. When the data signal is high or low continuously, there is no rising edge in the data signal. Therefore, the phase comparator determines that the data signal is in the locking state and sets the up signal and dn signal to the disable state. However, because there is a limitation of the number of data bits continuously having the same value depending upon a transmission system, the phase of the data signal can be necessarily detected in a certain bit unit. Therefore, in this embodiment, the data in units of 8 bits is used.

From the result of the majority determination of the number of up signals or dn signals set to the enable state or disable state, it is determined whether the clock signals in the circuit leads to or delays than the data signal as the whole clock recovery circuit.

Figure 9A:
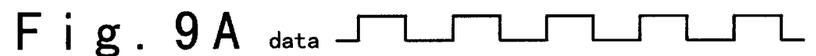
FIGS. 9A to 9P are timing charts to explain a part of the operation of a majority determining circuit.
Figure 9B:
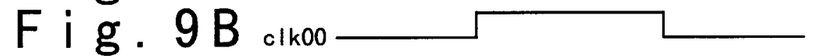
Figure 9C:
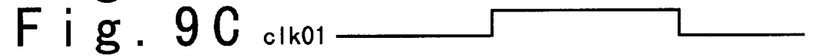
Figures 9D, 9E:
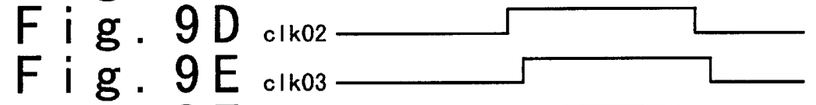
Figure 9F:
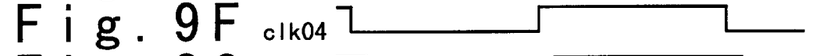
Figure 9G:
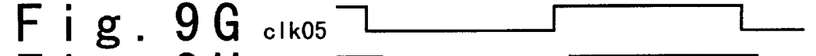
Figures 9H, 9I, 9J, 9K:
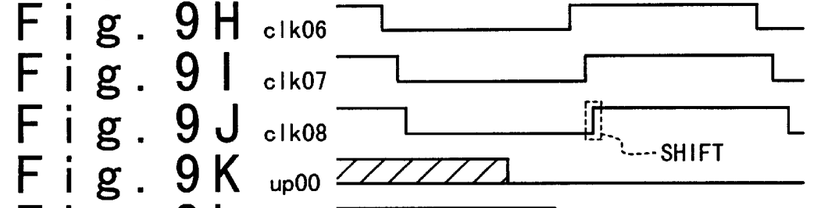
Figure 9L:
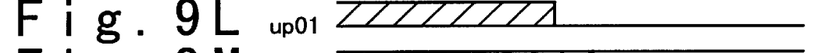
Figure 9M:
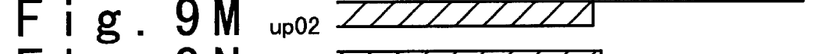
Figure 9N:
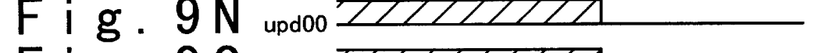
Figure 9O:
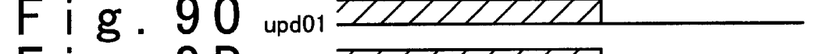
Figure 9P:
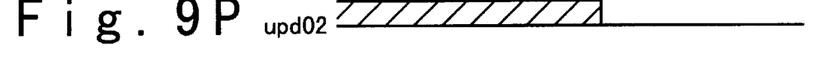

FIGS. 9A to 9P show the data signal and the clock signals clk00 to clk08, the up signals up01 to up02 outputted from the phase comparators TIPD0 to TIPD2 supplied, and the upd signals upd00 to upd02 corrected by the majority determining circuit DEC. In the state shown in FIGS. 9A to 9P, if there is not a phase shift in each clock signal, the clock signals are detected by all the phase comparators TIPD0 to TIPD7 to be in the phase delay state. As a result, the up signals are set to the enable state, and the dn signals are set to the disable state.

However, because there is a phase shift, i.e., the phase leading (proceeding) in the clock signal clk08 of FIG. 9J, the phase comparator TIPD2 supplied with the clock signals clk06 to clk08 determines to be in the locking state. Therefore, the phase comparator TIPD2 sets the up signal to the disable state, as shown in FIG. 9M, and the dn signal to the disable state. However, when the up signals are inputted from all the phase comparators TIPD0 to TIPD7 shown in FIG. 4, the majority determining circuit DEC determines the majority of the up signals and the dn signals. Therefore, the majority determining circuit DEC determines that the clock recovery circuit is in the phase delay state of the clock signals as the whole circuit. Thus, the upd02 signal as the output signal of the majority determining circuit DEC corresponding to the up02 signal is set to the enable state. Therefore, in the operation since then, an influence due to the phase shift of the clock signal clk08 is canceled.

Figures 10A, 10B:
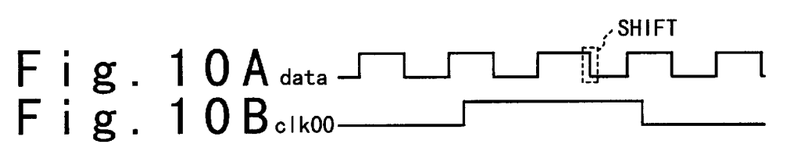
FIGS. 10A to 10P are timing charts to explain another part of the operation of the majority determining circuit.
Figure 10C:
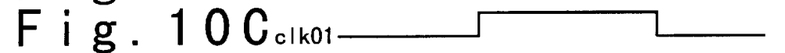
Figure 10D:
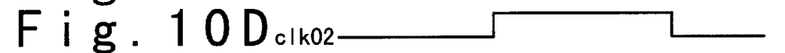
Figure 10E:
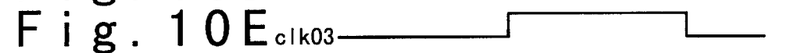
Figure 10F:
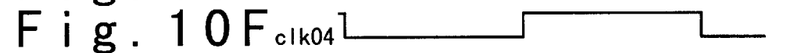
Figures 10G, 10H:
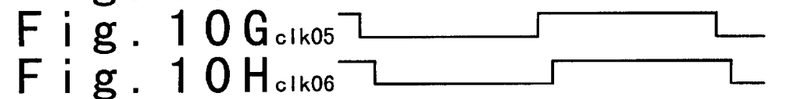
Figure 10I:
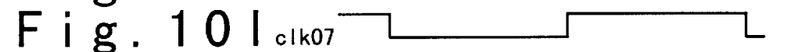
Figure 10J:
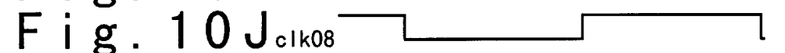
Figures 10K, 10L:
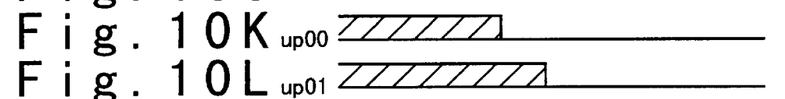
Figure 10M:
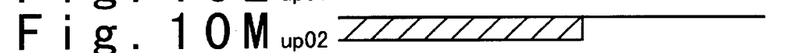
Figures 10N, 10O, 10P:
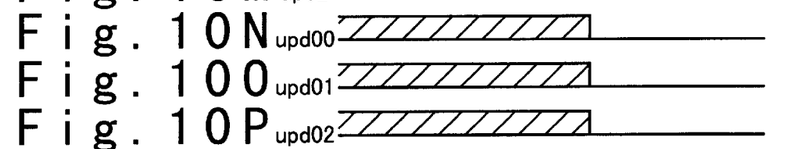

FIGS. 10A to 10P show timing charts of the data signal, the clock signals clk00 to clk08, the up signals and upd signals upd00 to upd02. Here, a case is shown where a phase shift of the data signal occurs at a certain bit to delay the phase of the data signal. When the phase shift occurs in the bit of the data signal, the majority determining circuit DEC could correct the phase shift, as in the above case where the clock signal is shifted in phase. That is, if there is not a phase shift in the bit of the data signal, the phase delay state of the clock signals is detected by the phase comparators TIPD0 and TIPD1. Therefore, the up signals up01 and up02 are set to the enable state. However, in this case, because there is a phase delay shift in the third bit of the data signal, the phase comparator TIPD2 inputting the third bit determines to be in locking state and sets the up signal to the disable state and the dn signal to the disable state. The majority determining circuit DEC determines the majority of the up signals and the dn signals outputted from all the phase comparators TIPD0 to TIPD7 shown in FIG. 4. Therefore, the majority determining circuit DEC determines that the clock signal delays than the data signal as the whole circuit. As a result, the majority determining circuit DEC sets the upd signal upd02 corresponding to the up02 signal outputted from the phase comparator TIPD2 to the enable state and the dnd signal dnd02 to the disable state. Therefore, in the operation since then, an influence due to the phase shift of the data signal is canceled.

Figure 11:
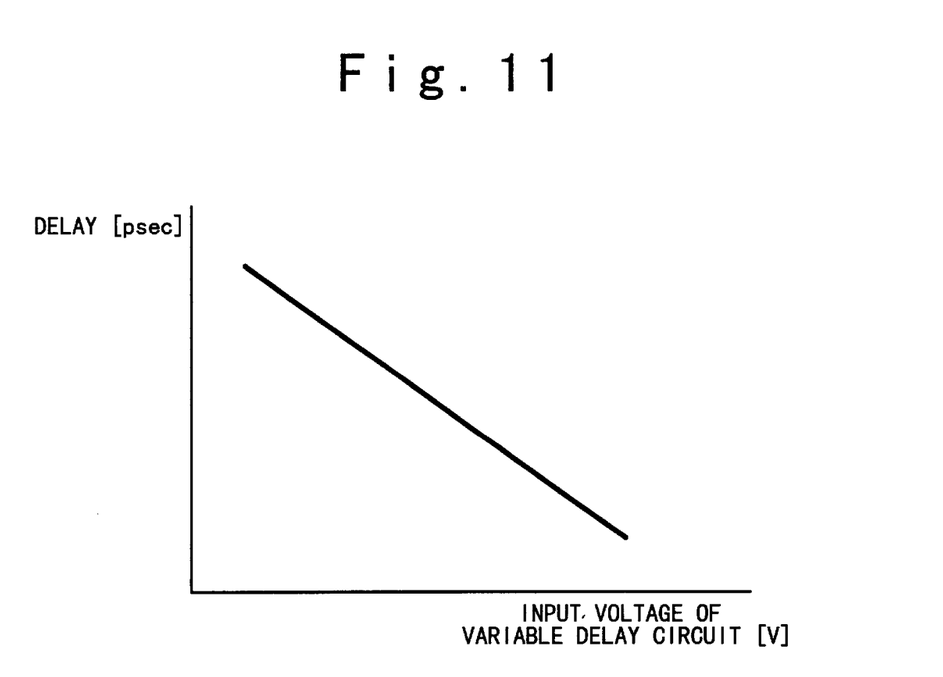
FIG. 11 is a diagram showing the input-output characteristic of a variable delay circuit.

In this way, because the phase shift of the clock signal or data signal is corrected by the majority determining circuit DEC, the respective charge pumps CP0 to CP7 supplied with the upd signals upd0 to upd7 and dnd signals dnd0 to dnd7, converts the phase difference data obtained from the upd signals and dnd signals into the voltage values. That is, when the upd signal is set to the enable state, the output voltage is increased, and when the dnd signal is set to the enable state, the output is decreased. The low pass filter LPF is supplied with the output voltages of the charge pumps PC0 to PC7 and integrates the change of this voltage. The variable delay circuit VD is supplied with the output voltage of the low pass filter LPF and the reference clock signal outputted from the voltage controlled oscillator VCO. The variable delay circuit VD delays and outputs the reference clock signal in accordance with the output voltage of the low pass filter LPF. FIG. 11 shows relation of a delay quantity to the input voltage of the variable delay circuit VD. The reference clock signal delayed by the variable delay circuit VD is supplied to the fixed delay circuit FD. Then, the fixed delay circuit generates the 24 clock signals having the same phase difference between the clock signals from the delayed reference clock signal, to output the clock signals to each of the phase comparator.

Therefore, when a phase shift is generated in a part of the clock signals having the fixed phases, or when the phase shift is generated in a part of the data signal, the majority determining circuit DEC corrects the phase difference data, even though the erroneous phase difference data is outputted from a part of the phase comparators TIPD0 to TIPD7. Therefore, it is possible to avoid the generation of inappropriate leading or delay of the clock signals in the fixed delay circuit FD owing to the erroneous phase difference data, resulting in the correct sampling of the data signal.

The embodiment shows an example of the present invention. It would not need to say that the number of bits of the data signal, the number of phase comparators and the number of clock signals having the fixed phases can be set suitably in accordance with the required speed.

As described above, according to the present invention, a majority determining circuit DEC is provided to input a plurality of phase difference data which are the outputs from a plurality of phase comparators TIPD0 to TIPD7. Also, the majority determining circuit DEC determines the majority of the phase difference data, and to correct and output the phase difference data on the minority side to the phase difference data on the majority side. Therefore, even if phase shifts of the plurality of the clock signals or the phase shift of the data signal are generated due to the influence of the layout, the phase difference data on the minority side generated from this phase difference can be corrected to the phase difference data on the majority side.

What is claimed is:

1. An over-sampling type clock recovery circuit comprising:

a phase difference determining section for determining a phase difference between a data signal and a plurality of clock signals using a majority determination, to produce a phase adjustment signal; and a phase adjusting section for adjusting phases of said plurality of clock signals based on said phase adjustment signal, wherein said phase difference determining section includes N (N is an integer equal to or more than 1) phase comparators provided for respective bits of data of said data signal, and wherein each of said N phase comparators compares a corresponding one of the bits and a set of clock signals in phase to produce a comparison phase difference signal.

2. The over-sampling type clock recovery circuit according to claim 1, wherein said phase difference determining section includes:

a majority determining circuit for determining a majority of said N comparison phase difference signals and changing a minority of said N comparison phase difference signals to match to the majority of said N comparison phase difference signals to generate N majority phase difference signals; and an adjustment signal generating section for generating said phase adjustment signal from said N majority phase difference signals.

3. The over-sampling type clock recovery circuit according to claim 2, wherein each of said phase comparators generates as said comparison phase difference signals, a first signal when said data signal leads said clock signal set, and a second signal when said data signal is delayed more than said clock signal set; and wherein said majority determining circuit determines said first signals to change each of said second signals into said first signal when said first signals are more than said second signals, and determines said second signals to change each of said first signals into said second signal when said second signals are more than said first signals.

4. The over-sampling type clock recovery circuit according to claim 2, wherein said phase adjusting section includes:

an oscillator for generating a reference clock signal;

a delay unit for delaying said reference clock signal based on said phase adjustment circuit; and a clock signal generating section for generating said plurality of clock signals from said delayed reference signal such that each of said plurality of clock signals has the predetermined delay.

5. A method of adjusting phases of clock signals in an over-sampling type clock recovery circuit comprising:

determining a phase difference between a data signal and a plurality of clock signals using a majority determination, to produce a phase adjustment signal; and adjusting phases of said plurality of clock signals based on said phase adjustment signal, wherein said determining said phase difference includes comparing each of N (N is an integer equal to or more than 1) bits of data of said data signal and a corresponding set of clock signals of said plurality of clock signals in phase to produce a comparison phase difference signal.

6. The method according to claim 5, wherein said determining said phase difference includes:

determining a majority of said N comparison phase difference signals to change a minority of said N comparison phase difference signals to match the majority of said N comparison phase difference signals to generate N majority phase difference signals; and generating said phase adjustment signal from said N majority phase difference signals.

7. The method according to claim 6, wherein said comparing includes generating as said comparison phase difference signals, a first signal when said data signal leads said clock signal set, and a second signal when said data signal is delayed more than said clock signal set, and wherein said step of determining majority of said N comparison phase difference signals includes determining said first signals to change each of said second signals into said first signal when said first signals are more than said second signals, and determining said second signals to change each of said first signals into said second signal when said second signals are more than said first signals.

8. The method according to claim 6, wherein said adjusting phases of said plurality of clock signals includes:

generating a reference clock signal;

delaying said reference clock signal based on said phase adjustment signal; and generating said plurality of clock signals from said delayed reference signal such that each of said plurality of clock signals has a predetermined delay.

9. An over-sampling type clock recovery circuit comprising:

an actual phase difference determining section for determining a phase difference between a data signal and a plurality of clock signals in units of bits of data of said data signals, to produce comparison phase difference signals;

an adjustment signal generating section for determining a majority of said comparison phase difference signals and generating a phase adjustment signal based on the determined majority; and a phase adjusting section for adjusting phases of said plurality of clock signals based on said phase adjustment signal, such that each of said plurality of clock signals has a predetermined delay.

10. The over-sampling type clock recovery circuit according to claim 9, wherein said adjustment signal generating section includes:

a majority determining circuit for determining a majority of said comparison phase difference signals and changing a minority of said comparison phase difference signals to match to the majority of said comparison phase difference signals to generate majority phase difference signals; and an adjustment signal generating section for generating said phase adjustment signal from said majority phase difference signals.

11. The over-sampling type clock recovery circuit according to claim 10, wherein said majority determining circuit determines said comparison phase difference signals of a first level to change a second level of each of said comparison phase difference signals into said first level when said comparison phase difference signals of said first level are more than said comparison phase difference signals of said second level, and determines said comparison phase difference signals of said second level to change said first level of each of said comparison phase difference signals into said second level when said comparison phase difference signals of said second level are more than said comparison phase difference signals of said first level.

12. The over-sampling type clock recovery circuit according to claim 10, wherein said actual phase difference determining section includes phase comparators provided for respective bits of data of said data signal, wherein each of said N phase comparators compares a corresponding one of the bits and a set of clock signals in phase to produce a comparison phase difference signal.

13. The over-sampling type clock recovery circuit according to claim 10, wherein said phase adjusting section includes:

an oscillator for generating a reference clock signal;

a delay unit for delaying said reference clock signal based on said phase adjustment signal; and a clock signal generating section for generating said plurality of clock signals from said delayed reference signal such that each of said plurality of clock signals has a predetermined delay.

14. The over-sampling type clock recovery circuit according to claim 1, wherein said phase difference determining section comprises a circuit for determining a majority of said N comparison phase difference signals and changing a minority of said N comparison phase difference signals to match the majority of said N comparison phase difference signals to generate N majority phase difference signals.

15. The over-sampling type clock recovery circuit according to claim 14, wherein said phase difference determining section includes an adjustment signal generating section for generating said phase adjustment signal from said N majority phase difference signals.

16. The over-sampling type clock recovery circuit according to claim 1, wherein said phase adjusting section adjusts said plurality of clock signals, such that each of said plurality of clock signals has a predetermined delay.

17. An over-sampling type clock recovery circuit comprising:

a means for determining a phase difference between a data signal and a plurality of clock signals using a majority determination, to produce a phase adjustment signal; and a means for adjusting phases of said plurality of clock signals based on said phase adjustment signal, wherein said phase difference determining means includes N (N is an integer equal to or more than 1) phase comparators provided for respective bits of data of said data signal, and wherein each of said N phase comparators compares a corresponding one of the bits and a set of clock signals in phase to produce a comparison phase difference signal.

18. The over-sampling type clock recovery circuit according to claim 17, wherein said phase difference determining means comprises:

means for determining a majority of said N comparison phase difference signals and changing a minority of said N comparison phase difference signals to match to the majority of said N comparison phase difference signals to generate N majority phase difference signals; and means for generating said phase adjustment signal from said N majority phase difference signals.

19. The over-sampling type clock recovery circuit according to claim 18, wherein each of said phase comparators generates as said comparison phase difference signals, a first signal when said data signal leads said clock signal set, and a second signal when said data signal is delayed more than said clock signal set, and wherein said majority determining means determines said first signals to change each of said second signals into said first signal when said first signals are more than said second signals, and determines said second signals to change each of said first signals into said second signal when said second signals are more than said first signals.

20. The over-sampling type clock recovery circuit according to claim 18, wherein said phase adjusting means comprises:

means for generating a reference clock signal;

means for delaying said reference clock signal based on said phase adjustment means; and means for generating said plurality of clock signals from said delayed reference signal such that each of said plurality of clock signals has a predetermined delay.

* * * * *